United States Patent
Cheng

(10) Patent No.: US 6,880,697 B2
(45) Date of Patent: Apr. 19, 2005

(54) BUCKLING STRUCTURE OF CD BOX

(76) Inventor: Hsi Sung Cheng, No70, 22 Lane, 1 section, Shin Jen Road, Tai Ping City, Taichung Hsien (TW)

( * ) Notice: Subject to any disclaimer, the term of this patent is extended or adjusted under 35 U.S.C. 154(b) by 12 days.

(21) Appl. No.: 10/458,686

(22) Filed: Jun. 11, 2003

(65) Prior Publication Data

US 2004/0251150 A1 Dec. 16, 2004

(51) Int. Cl.$^7$ .............................................. B65D 85/02
(52) U.S. Cl. ...................................... 206/303; 206/493
(58) Field of Search .............................. 206/303, 308.1, 206/309, 310, 493; 220/293, 297, 300, 301, 302, 780; 360/133; 369/291

(56) References Cited

U.S. PATENT DOCUMENTS 4,516,678 A  *  5/1985  Fotiadis et al. .......... 206/308.3
5,348,885 A  *  9/1994  Labarthe ................... 435/305.4
6,112,894 A  *  9/2000  Kikuchi et al. ........... 206/308.1
2004/0099548 A1  *  5/2004  Ito et al. ...................... 206/303

* cited by examiner

Primary Examiner—David T. Fidei

(57) ABSTRACT

A CD box comprises a seat and a cover. A center of the seat has an insertion hole for receiving the combining post. A periphery of the seat has an annular inner wall. A plurality of protruding strips are disposed around the annular inner wall. An upper surface of each protruding strip is formed as a downward inclined surface. An outer side of each downward inclined surface is formed with a plurality of positioning grooves. A section of annular inner wall is used to space two protruding strips. The sections are called as spacing sections. Each end of the protruding strip is an inclined surface. One edge of the cover has a plurality of inner protruding sheets corresponding to the spacing sections of the seat. Each inner protruding sheet is protruded with a positioning strip.

1 Claim, 4 Drawing Sheets

BUCKLING STRUCTURE OF CD BOX

FIELD OF THE INVENTION

The present invention relates to CD (compact disk) boxes, and particularly to a buckling structure of a CD box, wherein, the device does not deform due to lateral pressures and thus, the cover is tightly buckled to the seat.

BACKGROUND OF THE INVENTION

A prior art CD box is illustrated in FIGS. 1 and 2. The box has a seat 10. A combining post 11, an annular inner wall 14 and a plurality of reverse L shape lateral buckling sheets 2 are installed on the seat 10. A lower periphery of the cover 1 has a plurality of lower buckling sheets 12 corresponding to the lateral buckling sheets 2. When the cover 1 covers on the seat 10, and then rotates the cover 1, the lateral buckling sheets 2 will buckle to the lower buckling sheets 12.

However above prior art design has some defects which will be described herein.

When the cover 1 covers the seat 10, since the lateral buckling sheets 2 and lower buckling sheets 12 are short, if the cover 1 rotates through an angle, it will detach from the seat 10. Thus, the prior art cover can not be firmly positioned to the seat 10.

In covering the cover 1 to the seat 10, the lateral buckling sheets 2 must align to the lower buckling sheets 12 and then rotates the lateral buckling sheets 2. Thus, the operation is inconveniently.

When it is desired to pack a firm to the box, in general, since the lateral buckling sheets 2, lower buckling sheets 12 and seat 10 are protruded out (as shown by the dashed line of FIG. 2). The packing firm 3 only encloses the lower buckling sheets 12. The seat is not enclosed. Thereby the packing layer 301 only encloses the upper surface, but the lower surface exposes out. If it is desired to pack the seat 10, it must be executed manually. The operation is time and labor consumed.

Since the packing film cannot cover the seat 10, and thus the firm 3 has no the effect of preventing the cover from releasing.

The lower buckling sheets 12 easily break by pressure and thus the tolerance thereof is not good.

SUMMARY OF THE INVENTION

Accordingly, the primary object of the present invention is to provide a CD box comprises a seat and a cover. A center of the seat has an insertion hole for receiving a combining post. A periphery of the seat has an annular inner wall. A plurality of protruding strips are disposed around the annular inner wall. An upper surface of each protruding strip is formed as a downward inclined surface. An outer side of each downward inclined surface is formed with a plurality of positioning grooves. A section of annular inner wall is used to space two protruding strips. The sections are called as spacing sections. Each end of the protruding strip is an inclined surface. One edge of the cover has a plurality of inner protruding sheets corresponding to the spacing sections of the seat. Each inner protruding sheet is protruded with a positioning strip.

The various objects and advantages of the present invention will be more readily understood from the following detailed description when read in conjunction with the appended drawing.

DETAILED DESCRIPTION OF THE INTENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
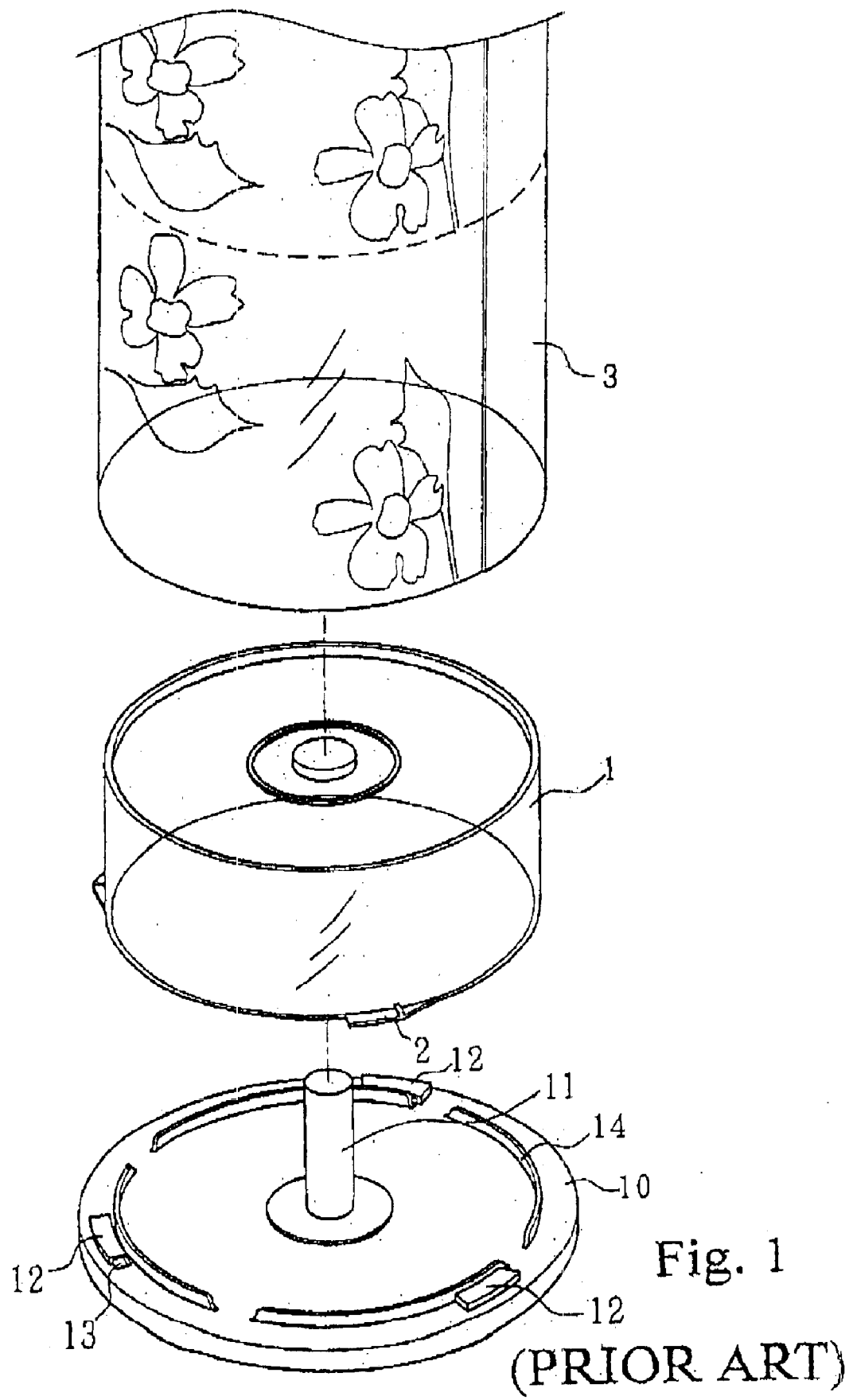
FIG. 1 is an exploded perspective view of the prior art.
Figure 2:
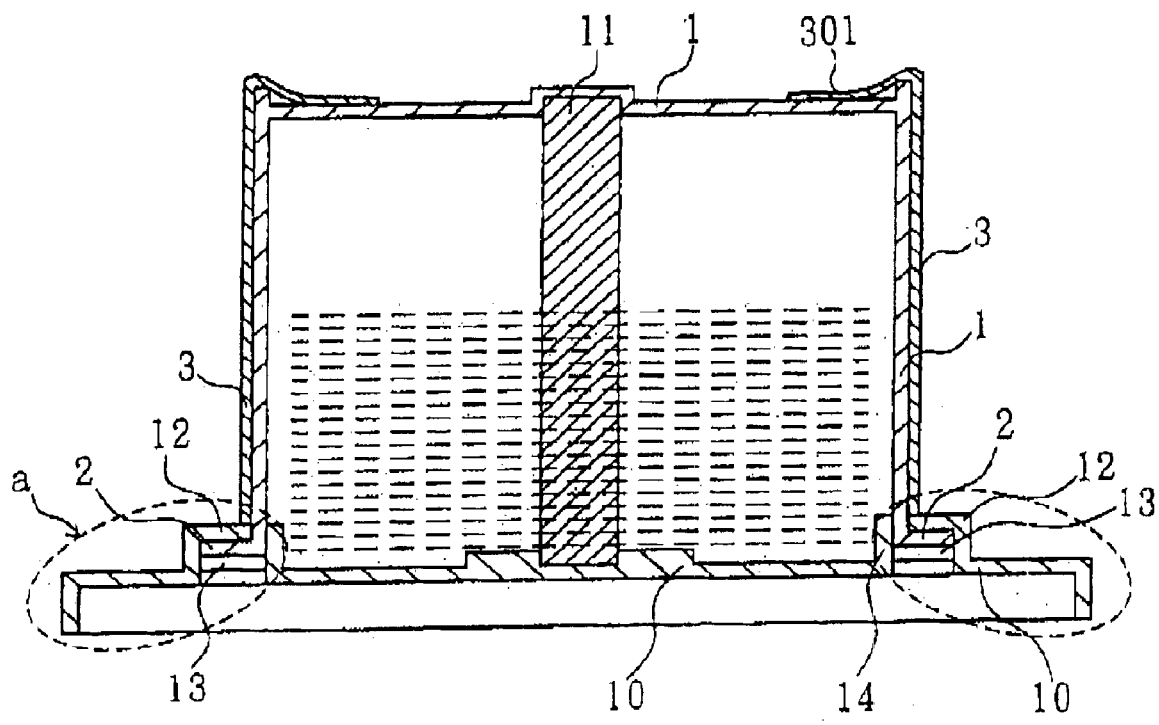
FIG. 2 shows the cross sectional view of the prior art.
Figure 3:
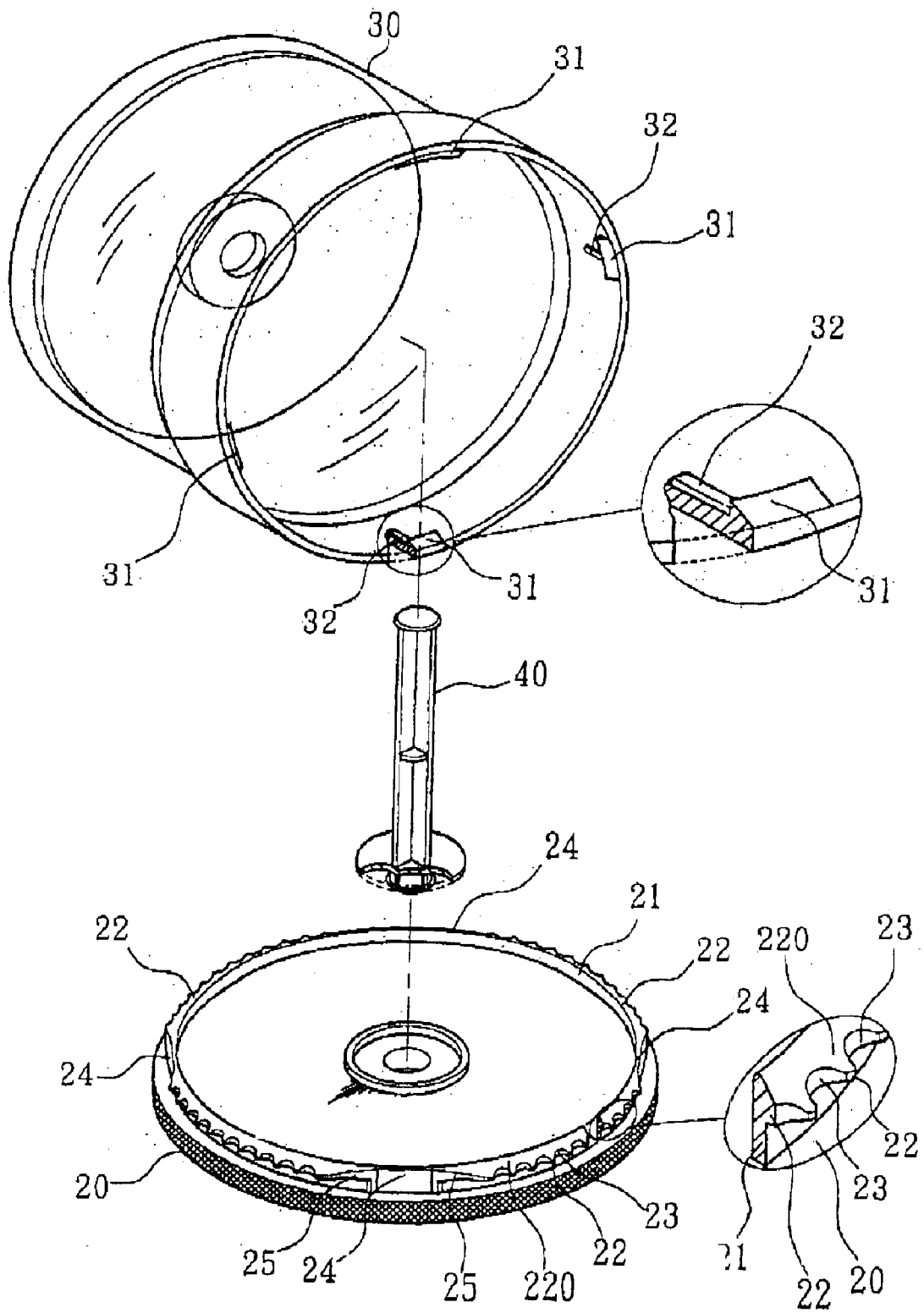
FIG. 3 is an exploded and a partial enlarge cross sectional view of the present invention.
Figure 4:
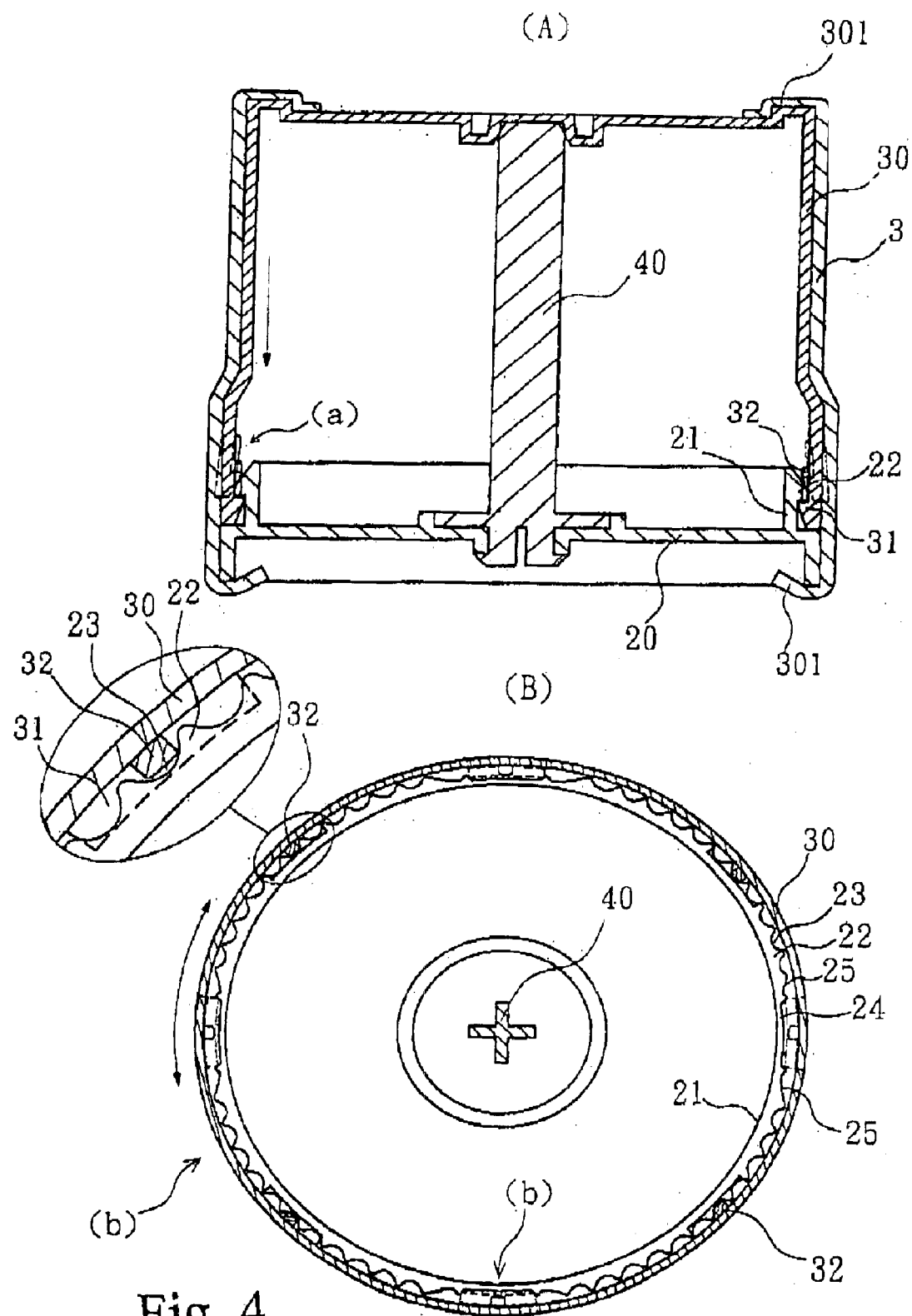
FIG. 4 is an exploded perspective view (A) and assembled cross sectional view (B) of the present invention.

With reference to FIGS. 3 and 4, the structure of the present invention includes a seat 20, a cover 30, and a combining post 40.

A center of the seat 20 has an insertion hole for receiving the combining post 40. Thereby, compact disk can be disposed on the combining post 40. A periphery of the seat 20 has an annular inner wall 21. A plurality of protruding strips 22 are disposed around the annular inner wall 21. An upper surface of each protruding strip 22 is formed as a downward inclined surface 220, an outer side of each downward inclined surface 220 is formed with a plurality of positioning grooves 23. A spacing section 24 of the annular inner wall 21 is used to space two protruding strips 22. Each end of the protruding strip 22 is an inclined surface 25.

The edge of the cover 30 has a plurality of inner protruding sheets 31 corresponding to the spacing sections 24 of the seat 20. Each inner protruding sheet 31 is vertically protruded with a positioning strip 32.

In realizing the present invention, the seat 20 and the cover 30 are integrally formed by plastic molding injection. In operation, when it is desired to assemble the cover 30 to the seat 20, it is only necessary that cover 30 aligns to the annular inner wall 21 of the seat 20 and then is pressed downwards. Thereby, each inner protruding sheet 31 of the cover 30 is buckled to the protruding strip 22 of the annular inner wall 21. Thus, the cover 30 and seat 20 are combined. When it is desired to detach the cover 30, the cover 30 is rotated so that the inner protruding sheets 31 align to the spacing sections 24 (referring to the dashed line B in FIG. 4B). That is, the inner protruding sheets 31 of the cover 30 will not be buckled so that the cover 30 can be taken out.

The effects and advantages of the present invention will be described herein.

The annular inner wall 21 of the seat 20 has a complete round shape without affecting by the protruding strips 22 and spacing sections 24. Thereby, the annular inner wall 21 has a preferred tolerance and can not deform. That is to say, it does not deform due to lateral pressures. Thus, the cover 30 is tightly buckled to the seat 20.

Moreover, the upper ends of the annular inner wall 21 of the seat 20 has a plurality of downward inclined surfaces 220. When the cover 30 covers on the seat 20, the downward inclined surfaces 220 can guide the inner protruding sheets 31 of the cover 30 to move smoothly (see the dashed line a of FIG. 4A). Thus, the inner protruding sheets 31 can be buckled at the lower end of the protruding strips 22. It is not necessary that the inner protruding sheets 31 are exactly aligned to the spacing sections 24. The operation is convenient.

When the cover 30 covers on the seat 20, the protruding strips 22 will buckle the inner protruding sheets 31, and the protruding strips 22 are longer than the width the inner protruding sheets 31. Thereby, the buckling of the protruding strips 22 and inner protruding sheets 31 are strong.

The inner protruding sheets 31 of the cover 30 have positioning strips 32. A lateral side of the protruding strip 22 of the seat 20 is formed with a plurality of positioning grooves 23. When the inner protruding sheets 31 are buckled to the protruding strips 22, the positioning strips 32 are embedded into the positioning grooves 23, respectively. Thereby, the positioning strips 32 have the function of confinement in two sides thereof. Thereby, the seat 20 and cover 30 can be not rotated by mistake. They are rotated by an intentional force.

The inclined surfaces 25 at two sides of each spacing section 24 of the seat 20 serve for guiding the positioning strips 32 so that when the cover 30 rotates, the positioning strips 32 will not be hindered by the protruding strips 22.

Furthermore, since the present invention is installed with protruding strips 22 which are buckled to the inner protruding sheets 31, when the cover 30 is combined to the seat 20, a periphery thereof has a straight surface, FIG. 4A. Furthermore, a tubular film 3 can enclose and the upper and lower surfaces are formed with enclosing edge 301. Thereby, it can be packaged with a prefect effect.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A buckling structure of a CD box comprising:

a seat; a center of the seat having an insertion hole for receiving the combining post; thereby, the combining post serving for locating compact disk; a periphery of the seat having an annular inner wall; a plurality of protruding strips being disposed around the annular inner wall; an upper surface of each protruding strip being formed as a downward inclined surface, an outer side of each downward inclined surface being formed with a plurality of positioning grooves; sections of the annular inner wall being used to space two protruding strips; the sections being called as spacing sections; each end of the protruding strip being an inclined surface; and a cover, one edge of the cover having a plurality of inner protruding sheets corresponding to the spacing sections of the seat; each inner protruding sheet being protruded with a positioning strip;

wherein in assembly, each inner protruding sheet of the cover is buckled to the protruding strip of the annular inner wall; the upper ends of the annular inner wall of the seat has a plurality of downward inclined surfaces; when the cover covers on the seat, the downward inclined surfaces guide the inner protruding sheets of the cover to move smoothly.

* * * * *